June 14, 1955  R. C. MESSMER  2,710,563
DEVICE FOR CONTROLLING MACHINING OPERATIONS
Filed Feb. 21, 1950  2 Sheets-Sheet 1
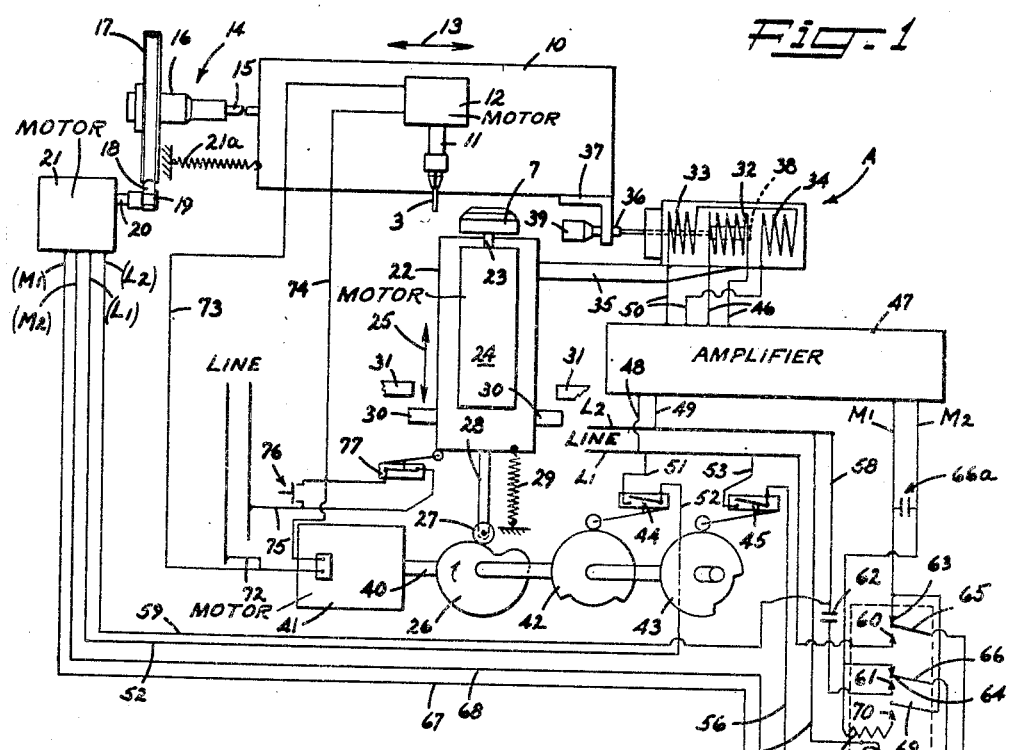
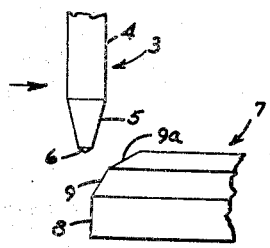
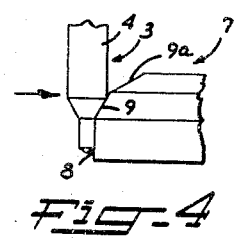
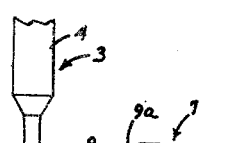
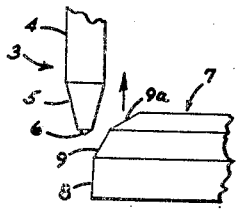
INVENTOR.
ROBERT C. MESSMER
BY
Thomas R. O'Malley
ATTORNEY.

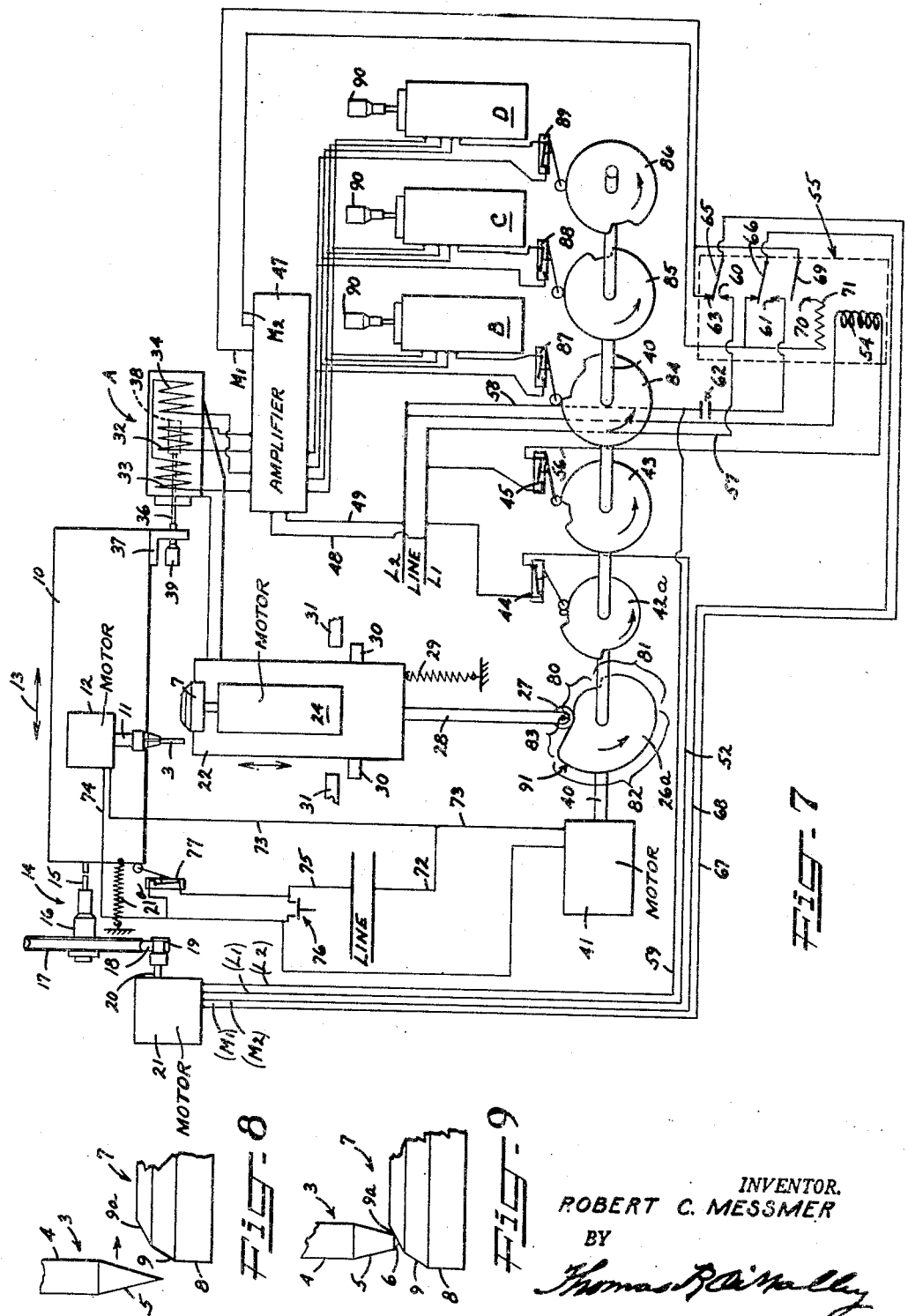

United States Patent Office 2,710,563
Patented June 14, 1955

2,710,563

DEVICE FOR CONTROLLING MACHINING OPERATIONS

Robert C. Messmer, Chester, Pa., assignor to American Viscose Corporation, Wilmington, Del., a corporation of Delaware Application February 21, 1950, Serial No. 145,481

6 Claims. (Cl. 90—14)

This invention relates to a device for controlling machining operations, particularly for controlling the relative positions and movements between a work piece and a "worker" or machining device. The invention is particularly concerned with machining operations upon relatively small work pieces, such as the punches used for making spinnerets employed in the industry for producing artificial filaments from viscose or other plastic material, though the controlling system herein described may be employed when larger work pieces and more extensive machine operations are involved.

In general, it is the object of the invention to provide a device for controlling the relative movement and positions of a work piece and a machine tool with great precision and accuracy. It is a further object of the invention to provide a control system that is easily adjusted for predetermining the relative positions and movements between the work and the worker (this term being hereinafter used to refer to the machine tool or other operating device) and that is readily adaptable to various machining operations. Other objects and advantages of the invention will be apparent from the drawing and the description thereof hereinafter.

In the drawing,

Figure 1 is a schematic diagram illustrating one embodiment of the invention,

Figures 2 to 6 are schematic diagrams constituting a series of views showing relative positions of a spinneret punch and a grinding wheel obtained consecutively by the system shown in Figure 1, Figure 7 is a schematic view of a modification, and Figures 8 and 9 are schematic diagrams similar to Figs. 2-6 but showing the operations performed with the apparatus of Fig. 7.

In general, the invention comprises a support for a work piece, that is the member to be machined, and a support for a machine tool or worker. Either or both of the supports is or are movable with respect to the other in a direction either (1) to bring the work and worker into closer proximity for the operation or to separate them or (2) to shift or traverse the work and worker either to bring them into proper position for a subsequent machine operation or to move them relatively during a machining operation, or (3) to provide both of these relative movements. An electric servomotor is provided for moving one of the supports and the direction and extent of motion imparted by the motor is controlled by means of a signalling or transmitting device comprising inductively related members, one of which is fixed to one of the supports and the other to the other support, proper adjusting means being provided to facilitate the presetting of the inductively related members. The inductively related members comprise on the one hand a primary and secondary winding and on the other hand a core of magnetic material. An alternating current is passed through the primary winding and the secondary winding is so disposed relative to the primary, such as by being divided into two halves in series, the halves being wound in opposite directions and symmetrically disposed axially with respect to the primary, as (1) to produce equal voltages of opposite phase which cancel out when the core is centered with respect to the coils and (2) to produce an over-balancing voltage of different phases when the core is off-set in opposite directions from the central position with respect to the coils. The secondary is in circuit with the servomotor which is a two-phase alternating current motor having two field windings, one of which is connected to an alternating current line and the other of which is in an electrical circuit connected with the secondary coil of the signalling device through an intervening amplifier for the signal voltage derived from the secondary. The direction of rotaton of the servomotor depends upon the phase of the voltage derived from the secondary through the amplifier and the motor stops when the secondary produces no voltage or signal. By means of this system, it is possible to control the distance of the worker from the work piece, such as from its axis, whether the worker operates upon the work during the attaining of the position in response to the signal from the secondary or the work and work piece are thereby positioned in preparation for relative traverse between them along the axis of the work.

The following description makes specific reference to a grinding operation. However, this system is equally adaptable to any other machining operations, such as turning, milling, boring, buffing, sanding, polishing, or the like.

Figure 1 illustrates the application of the invention to a grinding operation, more particularly to the traverse and plunge cuts which grind the effective tip of the punch to proper diameter and shape. The blank or stock from which the punch is to be made and which is the work or work piece referred to hereinabove is designated by the reference character 3 (see especially Figure 2). It comprises a cylindrical shank 4, a conical end 5 which has been provided with a point formed of a shallower cone 6. The grinding wheel 7 is of the contour shown in Figure 2 comprising a cylindrical surface 8 and conical surfaces 9 and 9a having different angles of inclination to the cylindrical surface.

The work piece 3 is carried on a support or carriage 10 and more specifically is mounted in a rotating spindle 11 rotated by a motor 12 secured to the support 10. The support 10 as shown is reciprocable in the direction of the arrow 13. For fine type of work, the support 10 is moved by means of a micrometer head 14 which comprises an externally threaded rod 15 moved axially by the internally threaded wheel 16 driven by a pulley 17. The pulley 17 is driven by a belt 18 from the pulley 19 on the shaft 20 of the servomotor 21. A spring 21a is secured to the support 10 and may serve to return it from its advanced positions.

The grinding wheel 7 is carried on a support or carriage 22. It is rotatably mounted on a spindle 23 rotated by a motor 24 carried on the support 22. As shown, the support 22 is moved in the direction of the arrow 25 by means of the driving cam 26 which engages a cam follower 27 carried on the end of the projecting rod 28 secured to the support 22. A spring 29 serves to return the support 22 and to keep the follower 27 in contact with the cam at all times. One or more lateral projections 30 secured to the support 22 may be provided so as to engage against the fixed abutments 31 when the grinding wheel is in its most advanced position. Any form of slideway may be provided for both of the supports 10 and 22. For example, the conventional dove-tailed guide within complementary parallel rails or guide members may be employed. For extremely fine work, such as grinding spinneret punches, motors 12 and 24 may be mounted separate from the supports 10 and 22 and the spindles 11 and 23 in such case are driven from the motors by suitably tensioned belts.

The signal device A for developing a signal voltage to control the servomotor comprises a coil system including the primary coil 32 and oppositely wound secondary coil halves 33 and 34. This coil system is fixedly secured upon a bracket 35 fixed to the support 22. A rod 36 adjustably carried in a bracket 37 attached to the support 10 carries a terminal core 38 of magnetizable material, such as iron or alloys thereof. Adjustment of the core 38 relative to the support 10 may be effected by providing external screw threads on the rod 36 which engage internal screw threads within the bore of the bracket 37 through which rod 36 extends, a knurled thumb nut 39 being provided to facilitate the turning. For precision work of the type herein described specifically, the core 38 may be positioned within the coils 32—34 with adequate clearance therebetween to allow of the necessary relative movement of the coils in a direction transverse of the rod when the support 22 is reciprocated in the direction of arrow 25. For coarser work where there are relatively large movements, the coils may be flattened and the core disposed laterally of the flattened coils, such as above, below, or to one side of the flattened coils.

The driving cam 26 is mounted on a shaft 40 driven by a motor 41. This shaft 40 carries also control cams 42 and 43. Cams 42 and 43 serve to open and close switches 44 and 45 respectively, the opening being effected by the rises of the cams and the closing being effected by the drops in the cam surfaces. The lead lines 46 of the primary coil 32 may derive voltage from any suitable source such as from a transformer in the amplifier 47, such as the transformer for producing the filament current of low voltage. Such transformer is fed by lines L1 and L2 from a source of alternating current by means of branch lines 48 and 49. The lead lines 50 from the secondaries 33 and 34 extend to the amplifier 47 and are connected to control the grid circuit therein. The amplified signal voltage is fed into lines M1 and M2 shown extending from the amplifier 47. Switch 44 is connected to L1 by a conductor 51 and to the servomotor by conductor 52. Switch 45 is connected to L1 by a conductor 53 and to a coil 54 of a relay 55 by a conductor 56, the other side of the coil 54 being connected by conductor 57 to line L2. Line L2 is connected by conductors 58 and 59 to the servomotor. In effect, L1 and L2 are connected to one field winding of the servomotor under the control of switch 44. Line L1 is connected to a normally open contact point 60 and line L2 is connected to a normally open contact point 61 of the relay 55, a condenser 62 being present in the connection with the line L2. Conductors M1 and M2 are connected to the normally closed contact points 63 and 64 respectively of the relay 55, and the relay switch blades 65 and 66 connect M1 and M2 respectively to the other field of the servomotor by means of conductors 67 and 68 respectively. A capacitor 66a may be provided to cause the motor winding to resonate at the particular operating frequency used but it may be omitted, if desired. A third blade 69 and a third normally open contact point 70 are provided in the relay for the purpose of placing the resistance 71 into the output circuit of the amplifier when the relay is operated.

The workpiece motor 12 and the cam or carriage motor 41 are connected to the line by means of conductors 72, 73, 74 and 75. These motors and the line are connected with a start push button switch 76 and a normally closed limit switch 77 which are connected in parallel. Switch 77 is opened upon retraction of the support 22 to its extreme initial position corresponding to the low point of cam 26.

In operation, the work and worker are initially in the relative positions shown in Figure 2 and the cam follower 27 is in the depth of the depression of the cam 26. In this position, both of switches 44 and 45 are open so that the L1—L2 field winding in the servomotor 21 is receiving no current. Hence, the servomotor is idle. The operator presses the push button 76 which starts the carriage motor 41 and the work rotating spindle 11. The support 22 is advanced in the direction of the arrow in Figure 3 by the rise in cam 26 to produce the traverse cut and bring the work and worker into the relative positions shown in Figure 4. When the follower 27 reaches the dwell at the top of the rise, cam 42 closes switch 44 completing the circuit through the field L1—L2 of the servomotor 21. This serves to move the work 3 toward the grinding wheel to provide a plunge cut to final size. The final position at the end of this stroke is determined by the initial adjustment of the core 38 within bracket 37 since the movement of work 3 is equal to the distance core 38 is off center in an axial direction between secondaries 33 and 38. When core 38 reaches the central position between secondaries 33 and 38, the voltages in these secondaries thereby become equal in opposite phase, canceling the signal voltage and causing the servomotor 21 to stop. After a predetermined period of time, as determined by the relative angular dispositions of the depressions in cams 42 and 43, cam 43 closes switch 45. This energizes relay 55 and through consequent throwover of switches 65 and 66 puts line voltage through capacitor 62 across one field of the servomotor by conductors 67 and 68. The capacitor 62 in line 58 is provided to give the phase relationship to reverse the servomotor 21 and retract the support 10. This retraction may amount to any desired distance depending upon the overlap of the depressions in cams 42 and 43 and is primarily to relieve contact between members 3 and 7 prior to retraction of the machine tool, in this instance the grinding wheel, and secondarily to gain clearance necessary for removal of the work piece. The servomotor stops when cam 42 raises the switch follower thereby opening switch 44. Thereafter, the cam 26 allows the spring 29 to return the support 22 to starting position. When the support 22 reaches its starting position, it opens switch 77 thereby disconnecting the source of current from the cam driving motor 41 and the work holding spindle motor 12. This permits the operator to replace the work piece in preparation for a second cycle of operations.

Figure 7 shows a modification and since many of the parts are identical with and connected in substantially the same manner as corresponding parts in the embodiment of Figure 1, the same reference characters will be applied wherever pertinent and it is to be understood that the foregoing description of Figure 1 applies equally as well to the correspondingly numbered parts in Figure 7.

In this embodiment, the cam 26a is somewhat modified in shape to provide a depressed dwell 80 of substantial arcuate extent, such as of 90° angularity. This precedes the gentle rise 81 which advances the grinding wheel, the latter being followed by an elevated dwell portion 82 and the last-mentioned portion being followed by a drop 83 to the depressed dwell.

Cams 42 and 43 are connected as in Figure 1 and control switches 44 and 45 respectively but in this embodiment there is provided not only the signal device A carried on brackets attached to the supports 10 and 22 as in Figure 1, but in addition, there are provided signal devices B, C and D of construction identical to that of A. Cams 84, 85 and 86 are carried on the common shaft 40 and control switches 87, 88 and 89 respectively are connected in series with the primary coils of the respective devices B, C and D. Switches 87, 88 and 89 are normally open when their switch followers ride upon the elevated cam surface and are closed when the switch followers ride in the depressions of the cam surfaces. The signal devices B, C and D are connected in parallel with each other but the common leads to their secondaries are connected in series with the leads from the secondary of signal device A in the grid control circuit of the amplifier. The depressions in cams 84, 85 and 86 are so arranged that each of the signal devices B, C and D respectively are effective to cooperate with the signal device A separately and in succession. The signal device A is connected to the amplifier at all tines in this embodiment. An adjusting micrometer 90 is associated with each of the signal devices B, C and D in order to facilitate the relative position of the cores within the coils thereof.

In this embodiment, the limit switch 77 may be associated with the work support instead of the wheel support so that it interrupts the circuit upon return of the work support to an initial position away from the grinding wheel.

The sequence of operations in this embodiment may be described by starting from a position where the cam follower 27 is beginning to ride over the depressed dwell 80 of cam 26a. The relative positions of work and worker correspond to that shown in Figure 8. At this starting position, the work support is at its extreme left and the operator starts rotation of the work spindle 11 and the cam motor 41 by depression of the push button 76. Cam 42 is in a position such that switch 44 is closed at this time and switch 87 is quickly closed so that the combination of signal devices A and B drives the servomotor to position the work support in prepointing relationship with the grinding wheel as shown in Figure 9. This operation had already been performed on the stock or work piece used at the beginning of the operations in the embodiment of Figure 1. Signal device B is cut out of the circuit by the opening of switch 87 under the action of cam 84 and thereupon signal device C is connected into the circuit so that the combined action of devices A and C influences the servomotor causing it to retract the work support 10 to a position corresponding to that shown in Figure 2.

Cam 26a then moves the wheel support forward under the influence of the rise portion 81. Thereafter, signal device C is cut out of the circuit and signal device D is put into the circuit by cam 86 so that a combination of devices A and D cause motion of the work support to the right into the position shown in Figure 4. Thereafter, signal device D is cut out of the circuit and switch 45 operates the relay 55, reversing the servomotor to take the work support back to initial position. The closing of switch 45 by cam 43 corresponds to position 91 of the elevated dwell portion of cam 26a so that the work is withdrawn from the grinding wheel before the grinding wheel is retracted by the fall 83 of cam 26a. When the wheel support and work support return to their initial positions, the limit switch 77 is opened by support 10 causing the cam driving motor to stop. At this point, the operator may remove and replace the work piece.

It is to be understood that changes and variations may be made without departing from the spirit and scope of the invention.

I claim:

1. In a machine tool of the type having a first carriage capable of linear movement, a second carriage capable of linear movement in a path at an angle to the path of movement of the first carriage, means for supporting a workpiece on one of said carriages, and means for supporting a tool on the other of said carriages, the improvement which comprises, in combination, a servo-motor for moving one of said carriages, a carriage motor for moving the other of said carriages to effect engagement of the tool and the workpiece, at least one electrical winding supported on the second carriage and movable therewith, a core mounted on the first carriage and positioned to inductively affect the winding on the second carriage, an amplifier connected to said winding, electrical connections between the amplifier and the servomotor, and means for starting and stopping the carriage motor.

2. In a machine tool of the type having a first carriage capable of linear movement, a second carriage capable of linear movement in a path at an angle to the path of movement of the first carriage, means for supporting a workpiece on one of said carriages, and means for supporting a tool on the other of said carriages, the improvement which comprises, in combination a servo motor for moving one of said carriages, a carriage motor, means including a cam driven by said carriage motor for moving the other of said carriages through a predetermined distance in timed relation with the speed of said motor to effect engagement of the tool and the workpiece, at least one electrical winding supported on the second carriage and movable therewith, a core adjustably mounted on the first carriage and positioned to inductively affect the winding on the second carriage, an amplifier connected to said winding, electrical connections between the amplifier and the servo motor, cam control switch means in said last named electrical connections associated with the carriage motor, and cyclical means for starting and stopping the carriage motor.

3. In a machine tool of the type having a first carriage capable of linear movement, a second carriage capable of linear movement in a path at an angle to the path of movement of the first carriage, means for supporting a workpiece on one of said carriages, and means for supporting a tool on the other of said carriages, the improvement which comprises, in combination, a servo motor for moving one of said carriages, a carriage motor, means including a cam driven by said carriage motor for moving the other of said carriages through a predetermined distance in timed relation with the speed of said motor to effect engagement of the tool and the workpiece, a plurality of windings supported on the second carriage and movable therewith, one of said windings being effective to determine a zero position for the first carriage, a core adjustably mounted on the first carriage and positioned to inductively affect the windings on the second carriage, an amplifier connected to said windings, electrical connections between the amplifier and the servo motor, a first cam control switch in the electrical connections for effecting rotation of the servo motor in one direction, a second cam control switch in said electrical connections for sequentially effecting rotation of the servo motor in the opposite direction, and means for starting and stopping the carriage motor.

4. A machine tool as defined in claim 3 in which the workpiece is mounted in a motor on the first carriage, and electrical connections between said workpiece motor and the carriage motor to simultaneously start and stop both said motors.

5. Apparatus as defined in claim 3 having means for adjusting the core with respect to the first carriage.

6. Apparatus as defined in claim 3 having a limit switch in parallel with the carriage motor switch, said limit switch being operable by the second carriage to open both the circuits to the workpiece motor and the carriage motor.

References Cited in the file of this patent

UNITED STATES PATENTS

| Number | Name | Date |
|---|---|---|
| 2,029,335 | Oberhoffken | Feb. 4, 1936 |
| 2,116,593 | Bouvier et al. | May 10, 1938 |
| 2,398,470 | Shivers | Apr. 16, 1946 |
| 2,399,675 | Hays | May 7, 1946 |
| 2,410,295 | Kuehni | Oct. 29, 1946 |
| 2,413,274 | Wilkie et al. | Dec. 24, 1946 |
| 2,447,848 | Edwards | Aug. 24, 1948 |
| 2,466,198 | Berthiez | Apr. 5, 1949 |
| 2,516,092 | Roessler, Jr. | July 18, 1950 |